United States Patent [19]

Jencek

[11] Patent Number: 4,706,886
[45] Date of Patent: Nov. 17, 1987

[54] EXTENDIBLE ROCKET-ENGINE NOZZLE

[75] Inventor: Premysl Jencek, Chatsworth, Calif.

[73] Assignee: Rockwell International Corporation, El Segundo, Calif.

[21] Appl. No.: 644,412

[22] Filed: Aug. 27, 1984

[51] Int. Cl.$^4$ ............................................. F02K 9/97
[52] U.S. Cl. .............................................. 239/265.33
[58] Field of Search ...................... 239/265.19, 265.33, 239/265.35, 265.37, 265.43; 60/271

[56] References Cited

U.S. PATENT DOCUMENTS

| | | | |
|---|---|---|---|
| 3,482,783 | 12/1969 | Nebiker et al. | 239/265.33 X |
| 3,596,465 | 8/1971 | Paine | 239/265.43 X |
| 3,637,140 | 1/1972 | Palovchik | 239/265.43 |
| 3,711,027 | 1/1973 | Carey | 239/265.19 |
| 3,951,342 | 4/1976 | Baker, Jr. | 239/265.33 |
| 4,125,224 | 11/1978 | Carey | 239/265.43 |
| 4,162,040 | 7/1979 | Carey | 239/265.33 |
| 4,169,555 | 10/1979 | Crowe | 239/265.33 |
| 4,184,238 | 1/1980 | Carey | 239/265.43 X |
| 4,313,567 | 2/1982 | Feight | 239/265.33 |
| 4,383,407 | 5/1983 | Inman | 239/265.33 X |
| 4,480,437 | 11/1984 | Gauge | 60/271 |
| 4,489,889 | 12/1984 | Inman | 239/265.33 |

OTHER PUBLICATIONS

*Aviation Week & Space Technology,* "CSD Studies Extendible Solid Motor Exit Cones", Feb. 13, 1984.

*Primary Examiner*—Andres Kashnikow
*Attorney, Agent, or Firm*—H. Fredrick Hamann; Harry B. Field; Lawrence N. Ginsberg

[57] ABSTRACT

Nozzle-extending apparatus for a rocket engine of a space vehicle formed by placing a telescoping, extendible sleeve section of nozzle around a short fixed section of nozzle in a rocket engine. The extendible nozzle section (ENS) is extended by inflating a main inflatable pressure vessel (MIV), which is located within the fixed section of nozzle. The expansion of the pressure vessel drives the extendible section rearward to the end of the fixed nozzle section (FNS) where it is locked into place. A secondary inflatable pressure vessel (SIV) is then inflated to activate devices which decouple the MIV from the nozzles and allow the MIV to pressurize the engine cavity, thus jettisoning the MIV from the extended nozzle volume. This is accomplished by opening valves in the front surface of the MIV inflatable bag at several locations allowing pressurized gas to be released in the front space of the FNS (engine cavity), the pressurized gas then exerting rearward ejecting force against the bag and other components positioned inside the extended nozzle.

27 Claims, 10 Drawing Figures

EXTENDIBLE ROCKET-ENGINE NOZZLE

BACKGROUND OF THE INVENTION

1. Field of the Invention

This invention relates to a rocket-engine nozzle and especially to an extendible rocket-engine nozzle.

2. Description of the Prior Art

Rocket engines operating around space stations, orbital transfer vehicles, and engines of high-orbit satellites use, during their operation, high-expansion-ratio nozzles of greater length than the inner volume of their carrier allows. Therefore the engine overall length must be reduced during transport, and then extended for operation. This problem of length can be solved by forming the extendible section, the latter being extended only after the vehicle has been deployed from its carrier.

OBJECTS OF THE INVENTION

An object of the invention is to increase the thrust of a rocket engine of a space vehicle by providing a large-expansion-ratio nozzle after the vehicle has been separated from its carrier.

A further object is to save storage space in space vehicles by decreasing the stowed length of a rocket nozzle.

SUMMARY OF THE INVENTION

In this description, the word "rearward" will refer to the direction toward the exit end of the nozzle and the word "front" to the direction in which the rocket will travel when activated.

The objects and advantages of the present invention are provided by placing a telescoping, extendible sleeve section of nozzle around a short fixed section of nozzle in a rocket engine. The extendible nozzle section (ENS) is extended by inflating a main inflatable pressure vessel(MIV), such as balloon, which is located within the fixed section of nozzle. The expansion of the pressure vessel drives the extendible section rearward to the end of the fixed nozzle section (FNS) where it is locked into place. A secondary inflatable pressure vessel (SIV) is then inflated to activate devices which decouple the MIV from the nozzles and allow the MIV to pressurize the engine cavity, thus jettisoning the MIV from the extended nozzle volume. This is accomplished by opening valves in the front surface of the MIV inflatable bag at several locations allowing pressurized gas to be released in the front space of the FNS (engine cavity), the pressurized gas then exerting rearward ejecting force against the bag and other components positioned inside the extended nozzle.

Other objects, advantages and novel features of the present invention will become apparent from the following detailed description of the invention when considered in conjunction with the accompanying drawing.

BRIEF DESCRIPTION OF THE DRAWINGS

FIGS. 7, 8 and 9 are partial schematics illustrating the operation of the invention.

The same elements or part through the figures of the drawings are designated by the same reference characters.

DETAILED DESCRIPTION OF THE PREFERRED EMBODIMENTS

Figure 1:
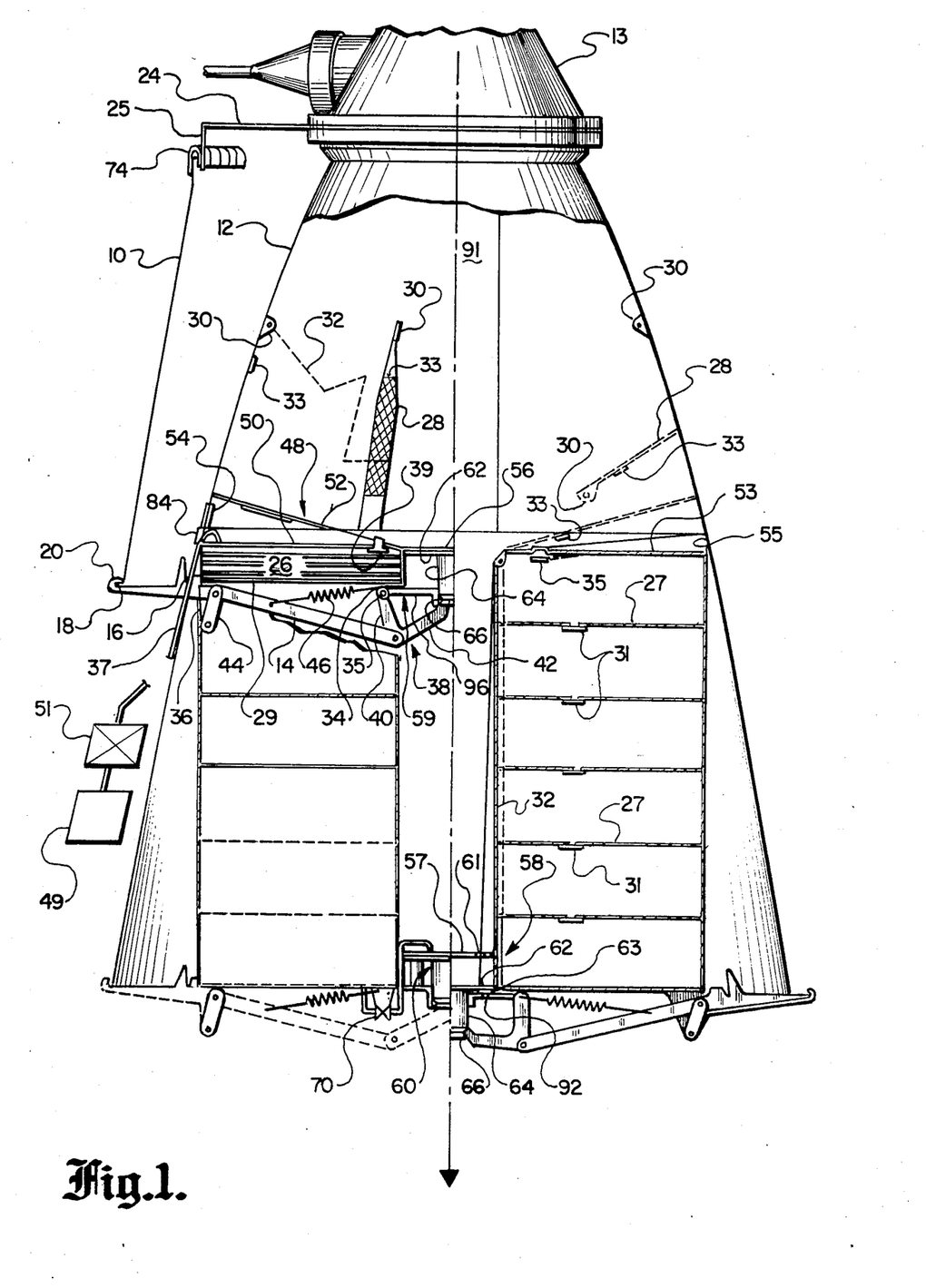
FIG. 1 is a cross-sectional, side view schematic illustration of an embodiment of the invention in two views, the upper left half showing the components in the retracted nozzle position and the lower half showing the components when the extendible nozzle section is in the fully extended position.
Figure 2:
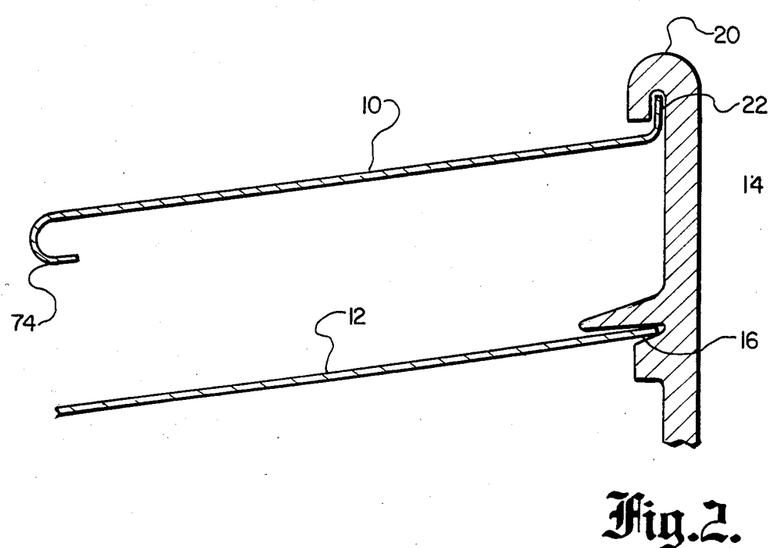
FIG. 2 is a partial schematic view illustrating a means for holding the ENS in its retracted position.

FIG. 1 is a schematic diagram illustrating a preferred embodiment of the invention. FIG. 1 illustrates, at the top left half of the figure, the invention in its initial position and, at the bottom half of the figure, the invention as the components appear when the MIV is fully expanded. The figure shows an extendible section of nozzle 10 telescoped around the outside of a fixed section of nozzle 12 of a rocket engine 13. The extendible nozzle 10 is fixed in place (centered and locked) by at least three spaced locking arms 14. Each locking arm 14 is formed with a notch 16 into which the rearward end of the fixed nozzle is inserted. The radially outer end of the arm 14 is formed with a hook 20 and the outer end of the rear of the extendible nozzle 10 is formed with a circular flange 22 (see FIG. 2), the flange 22 fitting inside the hook 20 whereby the rear end of the extendible nozzle 10 is held in place and centered. The forward end of the extendible nozzle 10 is centered by a set of at least three spaced centering rods 24, each of which has a finger 25 at its outer end to hold the nozzle end in place. A plate with a rearwardly extending circular flange may be used in place of the centering rods 24.

A main inflation vessel (MIV) comprising a doughnut-shaped, nozzle-extending, inflatable pressure vessel, or bag, 26 is placed inside the fixed nozzle 12 near its rear end. The MIV 26 is preferably formed in sections, separated by partitions 27, each separating partition 27 having a gas passage valve 31 therein to allow gas to pass from the front section to the next section, and so on, when the pressure is sufficient to open the valve 31. The front section is connected to a gas-supply source 49 by an umbilical cord 37 through a pressure-reduction valve 51. The gas tank 49 and valve 51 may be stored in the space vehicle of which the rocket engine 13 is a member. A doughnut-shaped support plate 29 is affixed to the rear surface of the MIV 26 by any suitable means, such as an adhesive, for example. The support plate 29 carries two rearwardly extending tabs 34 and 36, the inner tab 34 acting as a support for a force-transmission member 38 in the form of an angular member with two arms 40 and 42 separated by an angle. The free end of the outermost arm 40 is pivotally attached at 35 to the innermost tab 34 on the support plate 29.

The outermost tab 36 on the support plate 29 is pivotally connected at its rear end to the rear end of a short length of flat rigid material, or cleat, 44, the other end of which is attached to an intermediate location on the locking arm 14. A biasing means, such as a spring, 46 is connected between the innermost tab 34 and the locking arm 14.

Figure 3:
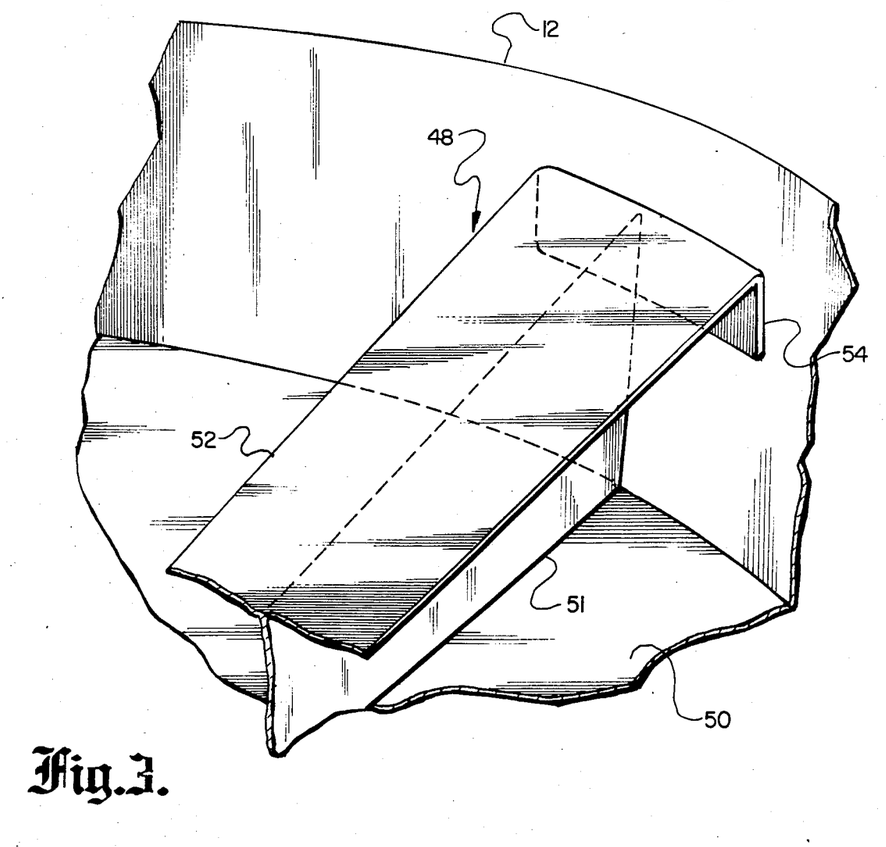
FIG. 3 is a partial schematic view illustrating a reinforcing rib means for sealing and seating the extendible nozzle deployment assembly within the fixed nozzle cavity.

Three or more spaced, reinforcing ribs 48 may optionally be located at the front surface of the MIV 26 to maintain the levelness of the front surface (see FIGS. 1 and 3). Each rib 48 is formed with a leg 52 and a reinforcing spine 51 at right angles thereto. Each rib 48 is attached toward the center of the nozzle to a doughnut-shaped plate 50 which lies in contact with the front surface of the inflatable bag 26. A load-distributing pad 54 may extend rearward from the outer end of the forward leg 52, in contact with the inside surface of the fixed nozzle 12. These ribs 48 may not be required if the front surface planarity is not greatly distorted.

Three or more equi-spaced tongues 28 of flexible material, which may, for example, be torpedo-shaped, are adhered to the inside surface of the fixed nozzle 12. Each tongue 28 carries at its forward end a small tab 30 with a hole therethrough. A small flat disc or pad, which is known as an anvil 33, is attached to each tongue 28 a small distance to the rear of the tab 30. The anvil 33 may be formed from a rigid material such as metal or a plastic, for example. The rear end of each tongue 28 is attached to a pressure-fit ring 55 which is an annular band attached to the periphery of a support plate 53 which abuts the front surface of the MIV 26. The front surface of the MIV 26 may be several layers thick, in which case a support plate 53 may be unnecessary. The tongues 28 and the pressure-fit ring 55 may be integrally formed from the same material, e.g., thin metal or plastic-coated fiberglass. If the pressure-fit ring 55 is a piece of rigid material formed integrally with or attached to the periphery of a support plate 53, an annular band of the fiberglass material may be fitted around its outer surface adjacent to the inner surface of the nozzle 12. The pressure-fit ring 55 forms a fairly tight seal between the fixed nozzle 12 and the MIV 26 and its associated components.

A tie 32, which may, for example, be a string, cable, or cord, is attached to the hole in the tab 30 of each tongue 28, and the tie 32 and tongue 28 are adhered to the inside wall of the fixed nozzle 12 by a loosely adhering glue, for example, so that it may be peeled away. The other end of each tie 32 is affixed by any suitable means to the flat portion 62 of the piston 60 located inside the container 58 of a second inflatable bag 56 (i.e. the secondary inflation vessel (SIV)). Holes 61 are bored through the forward wall 57 of the container 58 to admit the ties 32.

The second inflatable pressure vessel 56 (SIV), or decoupling bag, is located within a cup-shaped container 58 lying within the open space in the center of the doughnut-shaped, nozzle-extending bag 26. A piston 60, having a flat portion 62 and a shaft portion 64 with a notch 66 near its rear end, is placed to the rear of the (SIV) bag 56 with the flat portion 62 of the piston 60 adjacent to the rear surface of the bag 56. The unattached end of the innermost arm 42 of the force-transmission member 38 lies against the rear end of the shaft 64.

A pressure-sensitive valve 70 is coupled by short lines between the rearmost section of the nozzle-extending bag 26 (MIV) and the front surface of the deployment bag 56 (SIV).

Figure 7:
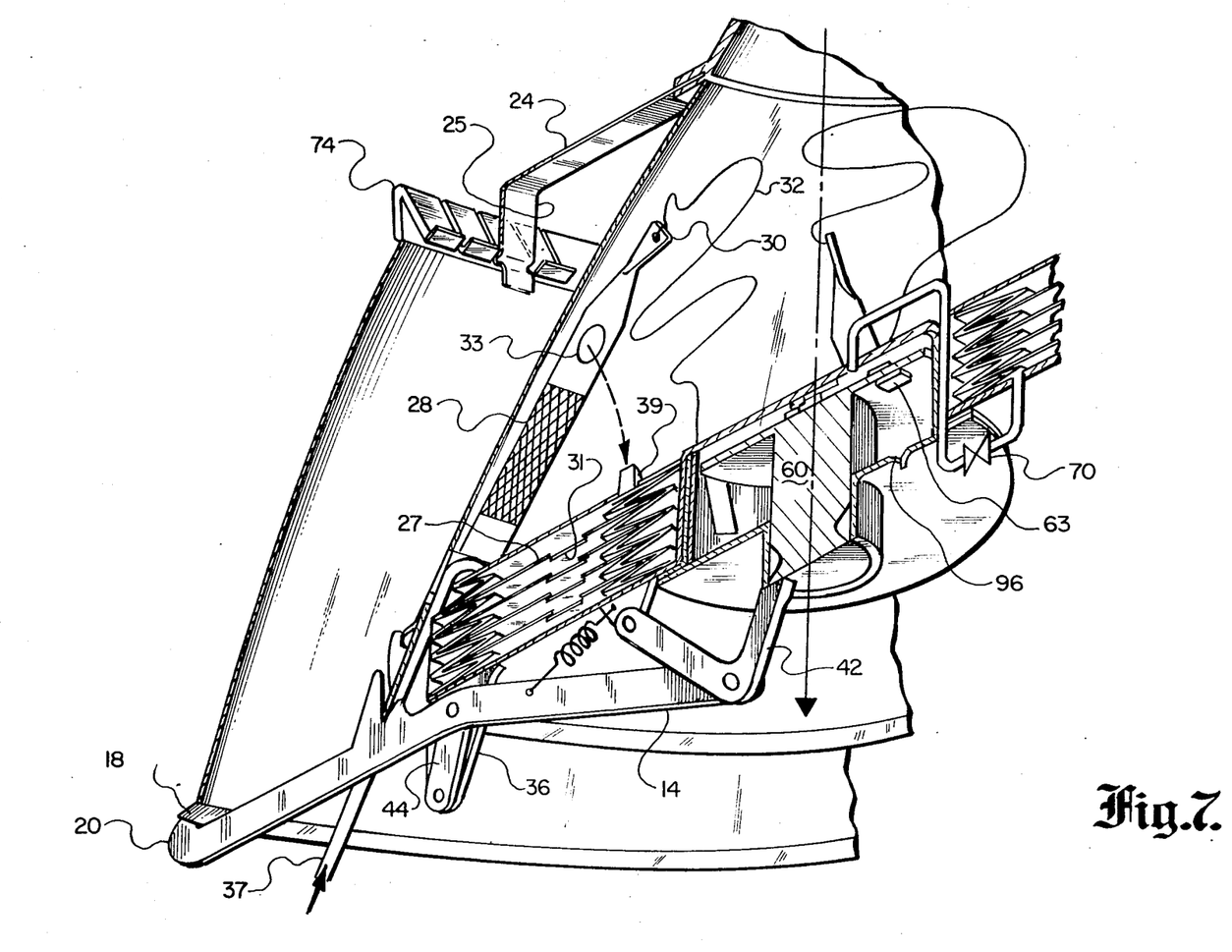
FIG. 7 shows the positions of various components before the activation of the MIV.
Figure 8:
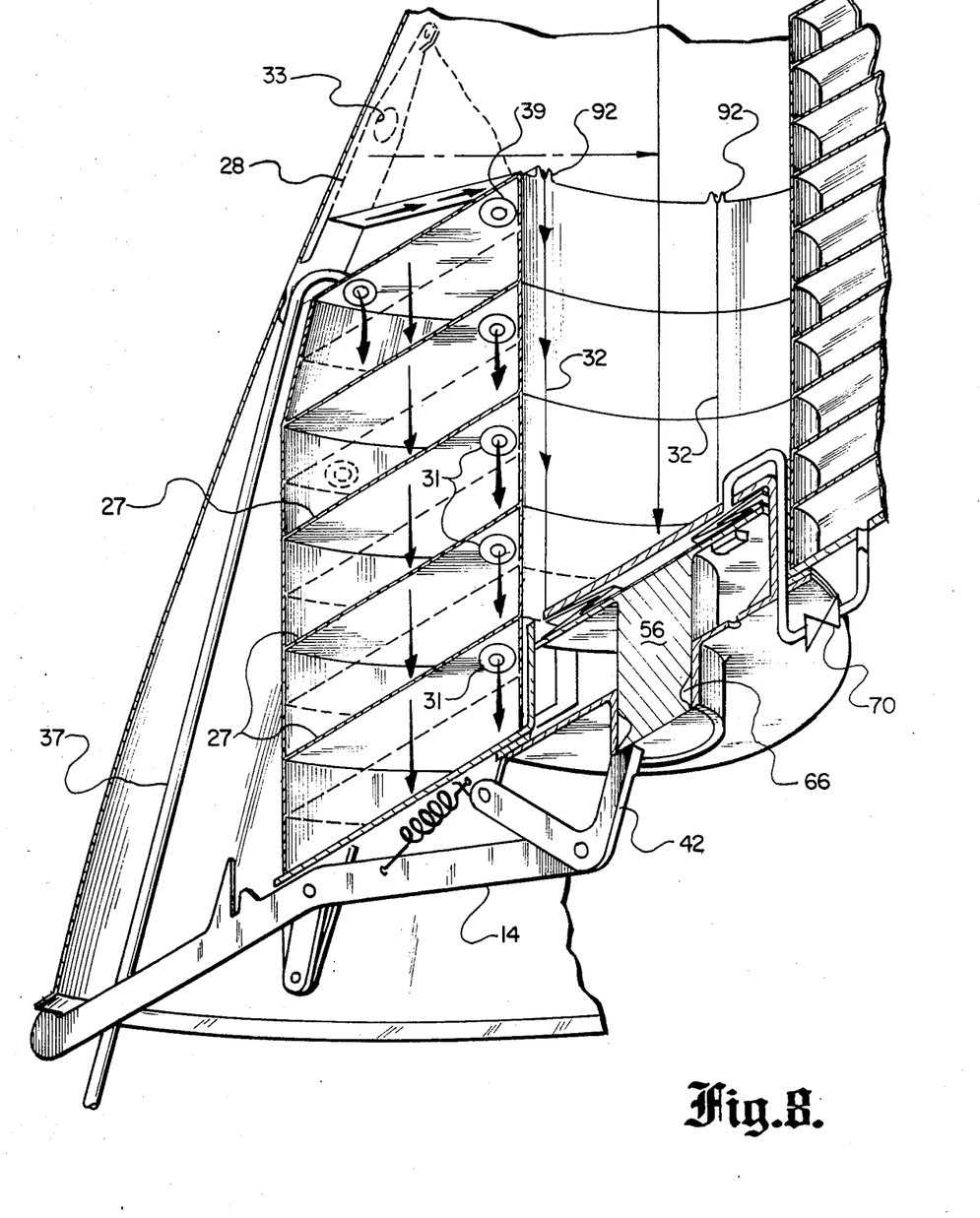
FIG. 8 shows the components after the MIV is inflated.

When the space vehicle in which the rocket engine of which the extendible nozzle is a part is deployed, operation of the invention is initiated by actuating a gas-supply source 49 which may be a small gas tank. The gas source sends controlled-pressure gas, such as $N_2$. He or Ar, for example, through an umbilical cord 37 into the front surface of the nozzle-extending bag 26. This inflates the front section of the bag 26 and, when a sufficient level of pressure is reached, the gas-passage valve 31 in the separating partition 27 between the front section and the next rearward section opens, permitting the gas to inflate the second section. This process continues until all MIV sections are inflated. As the volume of the bag 26 increases, the bag 26 pushes the ENS 10 to the rear, pulling the ties 32 and tongues 28 away from the inner wall of the nozzle section 12. The ENS 10 finally engages the lock-and-seal means which is located at the rear end of the fixed nozzle 12 and the forward end of the ENS 10.

Figure 4:
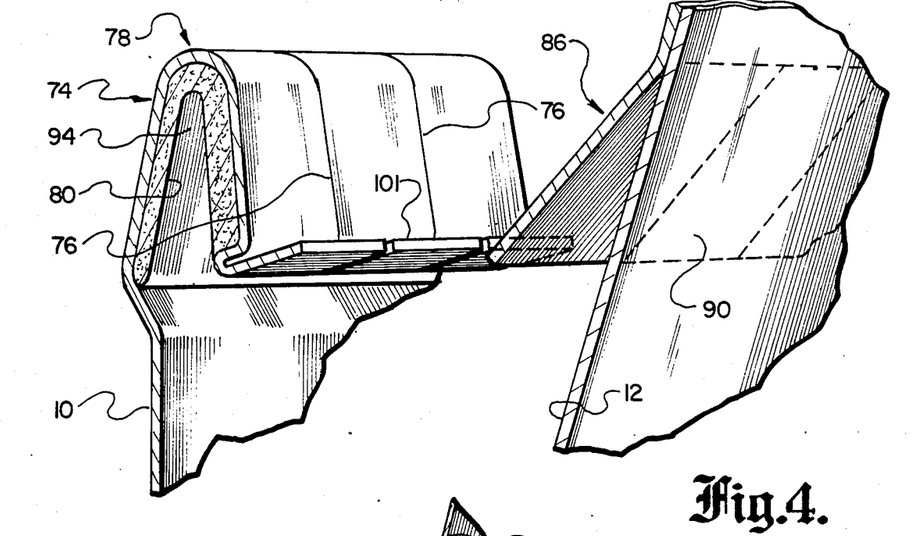
FIG. 4 is a partial schematic view showing the structure of the hook end of the ENS in the opened position, at the end of ENS.

The forward end of the ENS 10 (see FIG. 4) is shaped to form an inwardly extending peripheral hook 74 which is slotted 76 on the inner side as far as the curved end 78 of the hook 74. A hook-shaped band 80 of low-density, high-temperature graphite material, such as the material called Graphoil$^{(TM)}$, is fitted inside the extendible-nozzle hook 74. The foil is a relatively soft, pierceable, cohering material.

A rear annular member 82 (see FIG. 5) of the nozzle-locking means is attached to the outer surface of the fixed nozzle 12 near its rearward section. The annular member 82 has an outwardly set, forwardly extending, ring-shaped sealing lip 84. A forward annular member 86 of the nozzle-locking means is located a short distance forward of the rear annular member 82. The forward annular member comprises (see Fig.6) a flat band 88 affixed to the outer surface of the fixed nozzle 12 and a slotted, rearwardly extending set of resilient fingers 90 which flares outward from the flat section 88.

Figure 5:
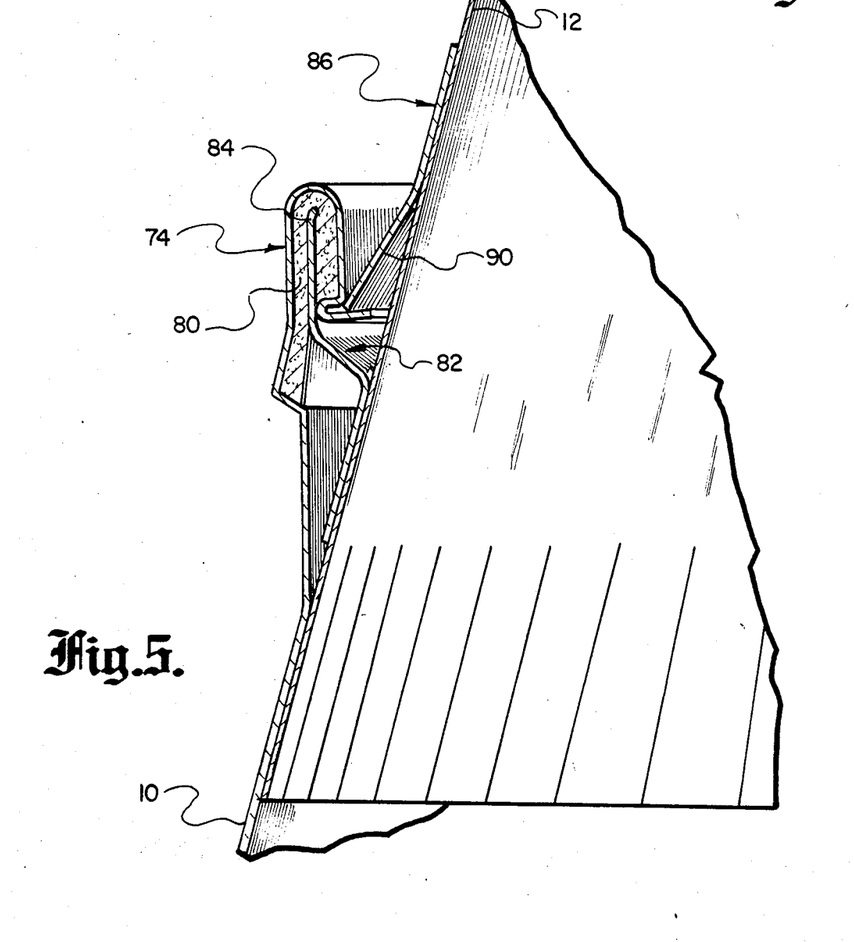
FIG. 5 is a schematic illustration of the seal-lock of the ENS in its fully extended position.
Figure 6:
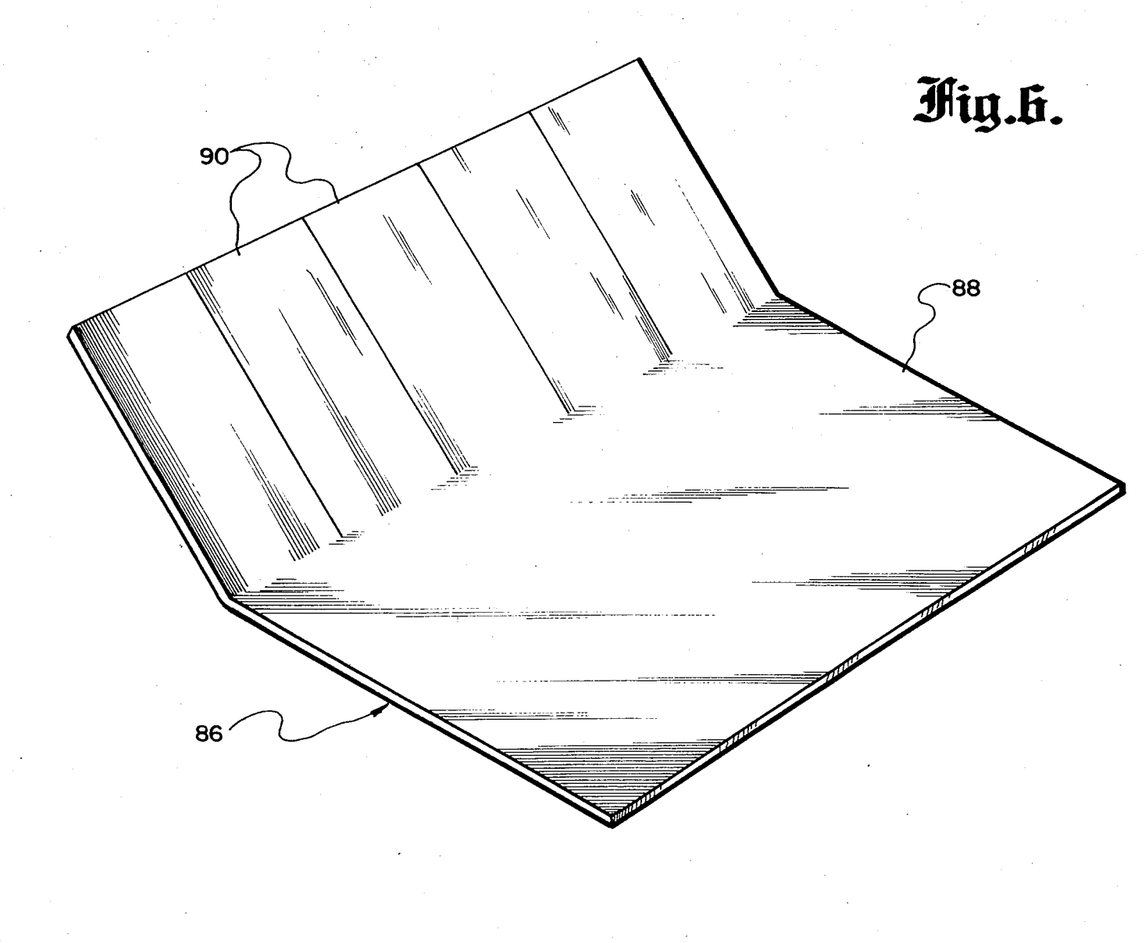
FIG. 6 is a schematic illustration of resilient finger section for exerting pressure on the seal-and-lock means to prevent the ENS from moving in the forward direction after the ENS is fully extended.

When the ENS 10 moves to the rear, the sealing lip 84 on the fixed nozzle 12 fits into the hook opening 94 lined by a continuous band of soft graphite material 80, the innermost edge of the sealing ring 84 biting into the graphite band 80 to form a seal. The resilient fingers 90 of the segmental, nozzle-locking means 86 are in contact with the slotted sections of the hook 74 on the ENS 10, and together exert a closing force to form a seal. The two nozzle sections 10 and 12 are thus locked together in sealing engagement. Each of the slotted segments 76 carries a snap-lock hook 101. When the extendible nozzle section 10 ends its travel and is in fully extended position, the fingers 86 spring back above the snap-lock hook 101 to prevent back-travel of the nozzle section 10.

As the inflatable bag 26 expands to the rear, it carries with it the container 58 in which the SIV 56 rests. The ties 32 which are tied to the plate 62 at the front surface of the SIV 56 are placed under tension. As the inflatable bag expansion continues, the tongues 28 are pulled from the inner wall of the nozzle 12 and, finally at full inflation of the MIV 26, the tabs 30 are pulled through guides 92 attached to the front surface of a doughnut-shaped, front support plate 53 of the MIV 26.

Figure 9:
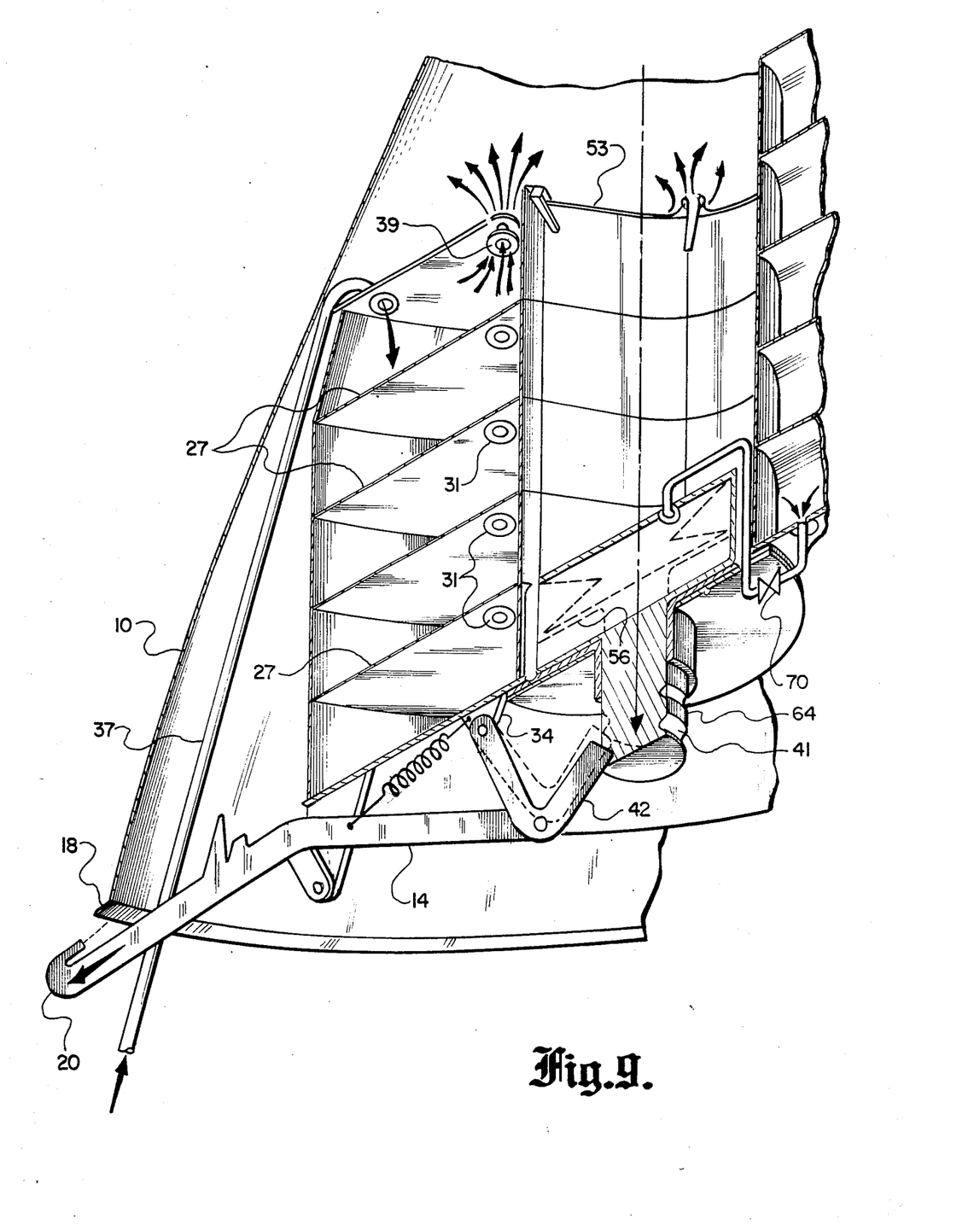
FIG. 9 shows the release of the extendible nozzle by the locking arms after the SIV has been inflated.

When the nozzle-extending inflatable bag 26 is pressurized sufficiently, at or near full inflation, the pressure-sensitive valve 70 opens and gas inflates the SIV bag 56. The latter expands to the rear within its container 58 pushing the flat portion 62 and shaft 64 of the piston 60 to the rear. The rear end of the shaft 64 forces the end of the innermost arm 42 of the force-transmission member 38 to the rear which acts to force all locking arms 14 outwards. This releases the flange 18 at the outer edge of the ENS 10 from the hooks 20 at the outer ends of the locking arms 14, thereby releasing the arms 14. The rearward movement of the piston shaft 64 pushes the rear end of the shaft 64 past the end of the innermost arm 42 of the force-transmission member 38 so that the notch 66 near the end of the shaft 64 engages the sharp end of the innermost arm 42, thereby preventing any locking arm 14 from returning to its original position. This prevents the hook 20 at the end of the locking arm 14 from reengaging the flange 18 at the outer edge of the fixed nozzle 12.

Vent holes 96 are bored through the cover of the SIV container 59 to allow air which fills the space 91 inside the fixed nozzle 12 to vent itself as it expands during ascent of the space rocket. The holes 96 are sealed by inflation of the SIV 56 so that the pressure is maintained inside the nozzle space 92 when gas is released therein from the MIV 26. The sealing of the vent holes 96 is accomplished by sealing pads 63 which are attached to the rear surface of the flat portion 62 of the piston 60 and are placed in sealing contact with the vent holes 96 when inflation of the SIV 56 pushes the flat portion 62 rearward.

As the SIV 56 expands, the full extension of the ties 32 presses the anvils 33 against the pressure-drain valves 39, opening the valves 39 and permitting the gas in the MIV 26 to fill the front space 96 in the fixed nozzle. The pressure finally reaches a level at which it forces the nozzle-extending means and the deployment means out of the extended nozzle, clearing out the interior of the extended nozzle so that the rocket engine can be started.

The nozzle-extending-and-deployment means comprises the nozzle-extending inflatable bag (MIV), the nozzle-centering rods and fingers, the gas-supply source, and the gas-passage valves, the tongues, anvils and ties, the piston, the SIV, the pressure-drain valves, and the air-passage valves.

The decoupling means comprises the secondary inflation vessel (SIV), the container for the SIV, the piston, the locking arms and their associated members, and the pressure-sensitive valve.

Figure 10:
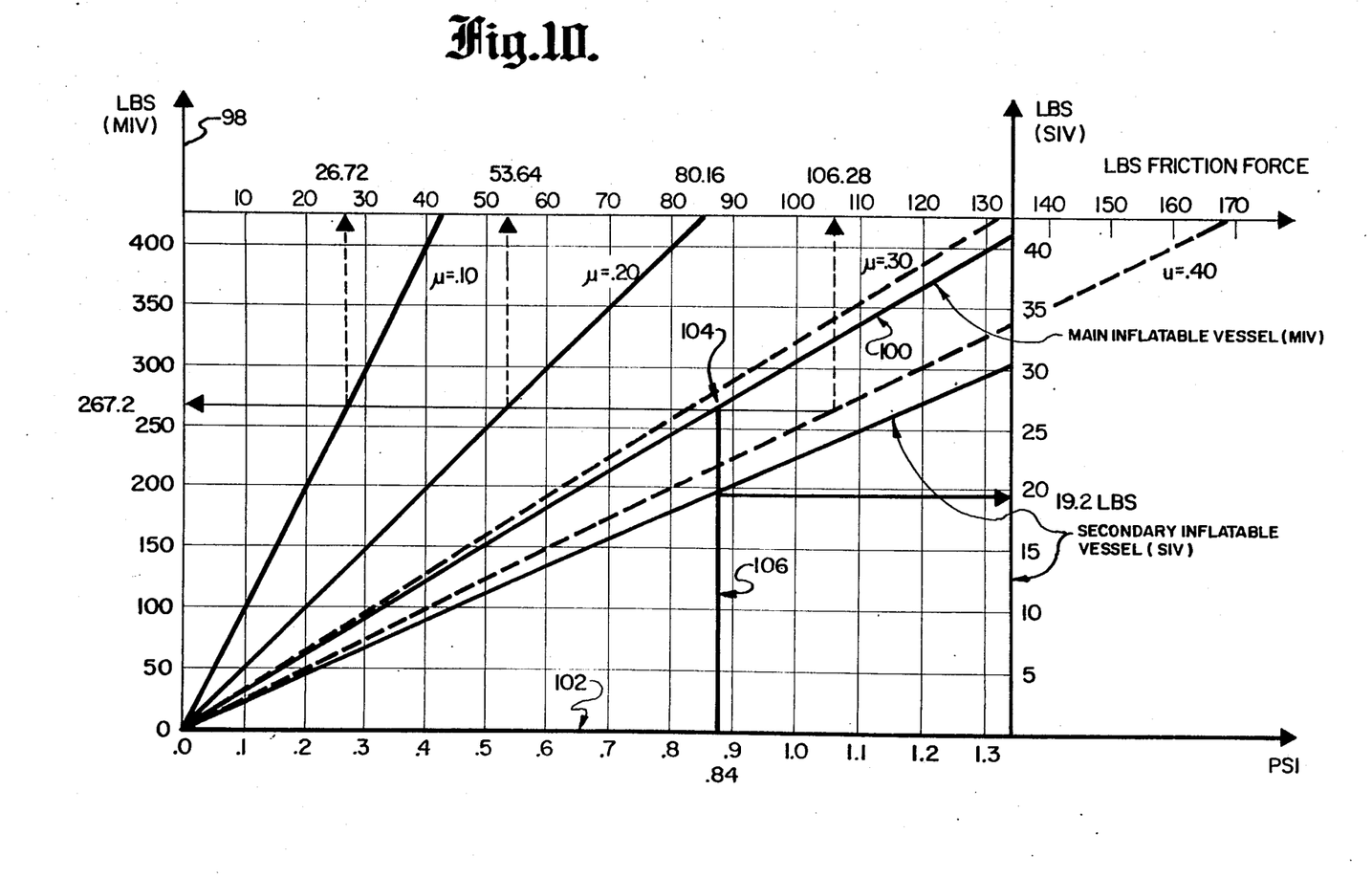
FIG. 10 is a graph plotting MIV and SIV force in pounds against pressure developed in the SIV.

FIG. 10 is a graph showing how some of the design parameters of the present device are determined. It is first necessary to determine the force necessary to lock the two nozzle section together and the coefficient of friction, $\mu$, for the locking mechanism. Assume the locking force is 267.2 lbs. A line is drawn from the 267.2 lb. level on the left-hand ordinate 98 to the main inflatable level (MIV) curve 100. A line is then dropped from the point of intersection to the bottom abscissa 102. The point of intersection 104 shows that the pressure in the MIV must be about 0.84 PSI to lock the nozzles. The point of intersection of the drop line 106 with the SIV curve shows that the force exerted by the gas in the SIV by the same pressure as in the MIV will be about 19.2 lbs. The pressure in the MIV expanded into space 92 creates a force available for jettisoning of the nozzle-extending-and-deployment means and the decoupling means. Considering coefficient of friction values, $\mu$, and single arm 14, the force needed to decouple the inflatable bags from the extended nozzle is 267.2 lbs. for $\mu=0.1$, 53.44 lbs. for $\mu=0.2$, 80.16 lbs. for $\mu=0.3$ and 106.88 lbs. for $\mu=0.4$.

Typical, but not to be taken as restrictive, dimensions for the inflatable bags are:
MIV—22.75" in height; 21" outside diameter; 6.0" diameter of central hole; cylindrical psiton 64;
SIV—1.75" in height; 5.4" outside diameter; 1.8" diameter of central hole;

The inflatable bags 26 and 56 may be made of a plastic-coated fiberglass fabric.

The gas-supply tank 49 may, for example, be pressurized at about 300 PSI and the pressure-reduction valve may reduce this pressure to about 1 PSI before admitting the gas to the umbilical cord 37. These figures are not to be taken as restrictive, but merely as illustrative.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States Is:

1. A rocket engine nozzle-extension apparatus comprising:
   a fixed nozzle section (FNS) attached to the engine;
   a unitary extendible nozzle section (ENS) which, in its retracted position, encircles the FNS in the manner of a spaced sleeve;
   nozzle-extending means for extending the ENS to a fully extended position which proceeds from the rear end of the FNS, said nozzle-extending means comprising a main inflatable bag located within the FNS, said bag having a front and a rear surface; and
   decoupling means for jettisoning said nozzle-extending means after the ENS is in its fully extended position, wherein
   both said nozzle-extending means and said decoupling means comprise inflatable bags.

2. Apparatus as in claim 1, wherein:
   said main inflatable bag is formed in sections which are separated by partition walls, each having a gas-pressure-operated, gas-passage valve therein.

3. Apparatus as in claim 1, including:
   means for connecting said main inflatable bag to a supply source of pressurized gas.

4. Apparatus as in claim 1, wherein:
   said nozzle-extending means includes lock-and-seal means comprising
   hook means at the outer edge of the forward end of said ENS.
   ring means at the outer edge of the rear end of said FNS.
   a hook-shaped band of pierceable, cohering material, said band fitting inside said hook means,
   said ring means fitting inside the opening of said hook-shaped band when the ENS is fully extended and partially piercing said band to form a seal therewith.

5. Apparatus as in claim 1, further comprising:
   FNS-grasping means associated with the rear surface of said main inflatable bag and moving therewith, said FNS-grasping means comprising a plurality of spaced, radially extending locking arms, each having a medially located notch therein in which the rear end of the FNS fits and having a hook at its outer end, the FNS having a peripheral ring at the outer edge of its rear end which fits into said hook.

6. Apparatus as in claim 5, further comprising:
rear support plate means attached to the rear surface of the main inflatable bag and having a pair of support tabs extending rearwardly thereof;
said FNS-grasping means further comprising a plurality of force-transmitting members and cleats;
each said cleat being pivotally attached to an outer one of said support tabs and fixedly attached to one of said locking arms;
each said force-transmitting member having two angularly separated arms, the free end of one arm being pivotally attached to an inner one of said support tabs and the apex of the angle formed by said arms being fixedly attached to the inner end of a locking arm.

7. Apparatus as in claim 1, further comprising:
rear support plate means affixed to the rear surface of said main inflatable bag; and
a secondary inflatable bag affixed to and moving with said rear support plate means.

8. Apparatus as in claim 7, wherein said main inflatable bag is doughnut-shaped, said apparatus further comprising:
rear support plate means affixed to the rear surface of said main inflatable bag,
a doughnut-shaped, secondary inflatable bag affixed to and moving with said rear support plate means, said bag having a front and a rear surface;
a cup-shaped container in which said secondary inflatable bag is carried, said container having a rear cover formed with a central aperture; and
a piston formed with a front flat portion and a rearwardly extending shaft which is coaxial with said central aperture,
said flat portion of said piston bearing against the rear surface of said secondary inflatable bag.

9. Apparatus as in claim 8, further comprising:
a pressure-sensitive valve connected between the rear of the main inflatable bag and the front of the secondary inflatable bag.
said pressure-sensitive valve opening at a predetermined pressure of gas in said main inflatable bag to allow that gas to fill and expand the secondary inflatable bag, inflation of said secondary inflatable bag pushingthe piston shaft rearward.

10. Apparatus as in claim 8, wherein:
said rear cover of said container of said secondary inflatable bag is formed with at least one vent hole therethrough,
said apparatus further comprising at least one sealing pad affixed to the rear surface of the flat portion of said piston, so that, when said piston is moved to the farthest extension to the rear, each sealing pad seals its associated vent hole.

11. Apparatus as in claim 10, further comprising:
rear support plate means attached to the rear surface of the main inflatable bag and having a pair of support tabs extending rearwardly thereof;
said FNS-grasping means further comprising a plurality of force-transmitting members and cleats,
each said cleat being pivotally attached to an outer one of said support tabs and fixedly attached to one of said locking arms;
each said force-transmitting member having two angularly separated arms, the free end of one arm being pivotally attached to an inner one of said support tabs and the apex of the angle formed by said arms being fixedly attached to the inner end of a locking arm,
said piston shaft having a circumferential notch near its rear end.
the free end of each force-transmitting member resting on the rear end of the piston shaft,
the rearward motion of the shaft rotating said force-transmitting member so that the locking arms move outwards and disengage the nozzle peripheral flange from the hooks at the ends of the locking arms.
the rotation of the force-transmitting member also displacing their free ends from the rear ends of the shaft so that the shaft moves past the free ends and the free ends become engaged in the circumferential notch.

12. Apparatus as in claim 11, further comprising:
a plurality of biasing means, each connected between a locking arm and an inner support tab on said rear support plate, said biasing means maintaining the engagement of the free ends of said force-transmitting members and the circumferential notch in the piston shaft.

13. Apparatus as in claim 1, further comprising:
a plurality of pressure-drain valves in the front surface of said main inflatable bag, said valves being operable by mechanical force to open and allow gas from the main inflatable bag to escape into the forward end of the FNS;
a plurality of tongue means non-permanently adhered at spaced locations to the inside of said FNS in the front-to-rear direction of the FNS, each tongue means having an anvil affixed to the inner surface thereof;
a plurality of ties, each affixed to the front end of a different one of said tongue means;
a support plate adjacent to the rear surface of said main inflatable bag and having an outer periphery;
an annular band affixed to the periphery of said support plate, said band providing a pressure fit with the inner surface of the FNS, and the rear end of each said tongue means being affixed to said annular band,
rearward tension on said ties acting to peel the tongue means from the inside of the FNS and place the anvils in contact with the pressure-drain valves, forcing the valves to open.

14. Apparatus as in claim 13, further comprising:
rear support plate means affixed to the rear surface of said main inflatable bag; and
a secondary inflatable bag affixed to and moving with said rear support plate means.

15. Apparatus as in claim 14, wherein:
said secondary inflatable bag is doughnut-shaped and has a front and a rear surface;
said apparatus further including:
rear support plate means affixed to the rear surface of the main inflatable bag, the secondary inflatable bag affixed to and moving with said rear support plate means,
a cup-shaped container in which said secondary inflatable bag is carried, said container having a rear cover formed with a central aperture,
a piston formed with a front flat portion and a rearwardly extending shaft which is coaxial with said central aperture,
said flat front portion bearing against the rear surface of said secondary inflatable bag.

16. Apparatus as in claim 15, further including:
a pressure-sensitive valve connected between the rear of the main inflatable bag and the front of the secondary inflatable gag,
said pressure-sensitive valve opening at a predetermined pressure of gas in said main inflatable bag to allow that gas to fill and expand the secondary inflatable bag, inflation of said secondary inflatable bag pushing the piston shaft rearward.

17. Apparatus as in claim 15, further including:
a pressure-sensitive valve connected between the rear of the main inflatable bag and the front of the secondary inflatable gag,
said pressure-sensitive valve opening at a predetermined pressure of gas in said main inflatable bag to allow that gas to fill and expand the secondary inflatable bag, inflation of said secondary inflatable bag pushing the piston shaft rearward.

18. Apparatus as in claim 17, wherein:
the rear end of said ties are affixed to the flat portion of said piston, inflation of said secondary inflatable bag acting to push said flat portion to the rear and pull the ties rearwardly so that the anvils mechanically contact the pressure-drain valves to force them to open.

19. Apparatus as in claim 17, wherein:
the rear end of said ties are affixed to the flat portion of said piston, inflation of said secondary inflatable bag acting to push said flat portion to the rear and pull the ties rearwardly so that the anvils mechanically contact the pressure-drain valves to force them to open.

20. A rocket engine nozzle-extension apparatus comprising:
a fixed nozzle section (FNS) attached to the engine;
an extendible nozzle section (ENS) which, in its retracted position, encircles the FNS in the manner of a spaced sleeve;
nozzle-extending means for extending the ENS to a fully extended position which proceeds from the rear end of the FNS, said nozzle-extending means comprising a doughnut-shaped main inflatable bag located within the FNS, said bag having a front and a rear surface;
decoupling means for jettisoning said nozzle-extending means after the ENS is in its fully extended position;
rear support plate means affixed to the rear surface of said main inflatable bag;
a doughnut-shaped secondary inflatable bag affixed to and moving with said rear support plate means, said bag having a front and a rear surface;
a cup-shaped container in which said secondary inflatable bag is carried, said container having a rear cover formed with a central aperture; and
a piston formed with a front flat portion and a rearwardly extending shaft which is coaxial with said central aperture,
said flat portion of said piston bearing against the rear surface of said secondary inflatable bag.

21. Apparatus as in claim 20, further comprising:
a pressure-sensitive valve connected between the rear of the main inflatable bag and the front of the secondary inflatable bag,
said pressure-sensitive valve opening at a predetermined pressure of gas in said main inflatable bag to allow that gas to fill and expand the secondary inflatable bag, inflation of said secondary inflatable bag pushing the piston shaft rearward.

22. Apparatus as in claim 20, wherein:
said rear cover of said container of said secondary inflatable bag is formed with at least one vent hole therethrough,
said apparatus further comprising at least one sealing pad affixed to the rear surface of the flat portion of said piston, so that, when said piston is moved to the farthest extension to the rear, each sealing pad seals its associated vent hole.

23. Apparatus as in claim 22, further comprising:
rear support plate means attached to the rear surface of the main inflatable bag and having a pair of support tabs extending rearwardly thereof;
said FNS-grasping means further comprising a plurality of force-transmitting members and cleats,
each said cleat being pivotally attached to an outer one of said support tabs and fixedly attached to one of said locking arms;
each said force-transmitting member having two angularly separated arms, the free end of one arm being pivotally attached to an inner one of said support tabs and the apex of the angle formed by said arms being fixedly attached to the inner end of a locking arm,
said piston shaft having a circumferential notch near its rear end,
the free end of each force-transmitting member resting on the rear end of the piston shaft,
the rearward motion of the shaft rotating said force-transmitting member so that the locking arms move outwards and disengage the nozzle peripheral flange from the hooks at the ends of the locking arms.
the rotation of the force-transmitting member also displacing their free ends from the rear ends of the shaft so that the shaft moves past the free ends and the free ends become engaged in he circumferential notch.

24. Apparatus as in claim 23, further comprising:
a plurality of biasing means, each connected between a locking arm and an inner support tab on said rear support plate, said biasing means maintaining the engagement of the free ends of said force-transmitting members and the circumferential notch in the piston shaft.

25. A rocket engine nozzle-extension apparatus comprising:
a fixed nozzle section (FNS) attached to the engine;
an extendible nozzle section (ENS) which, in its retracted position, encircles the FNS in the manner of a spaced sleeve;
nozzle-extending means for extending the ENS to a fully extended position which proceeds from the rear end of the FNS, said nozzle-extending means comprises a main inflatable bag located within the FNS, said bag having a front and a rear surface;
decoupling means for jettisoning said nozzle-extending means after the ENS is in its fully extended position;
a plurality of pressure-drain valves in the front surface of said main inflatable bag, said valves being operable by mechanical force to open and allow gas from the main inflatable bag to escape into the forward end of the FNS;
a plurality of tongue means non-permanently adhered at spaced locations to the inside of said FNS in the front-to-rear direction of the FNS, each tongue means having an anvil affixed to the inner surface thereof;

a plurality of ties, each affixed to the front end of a different one of said tongue means;

a support plate adjacent to the rear surface of said main inflatable bag and having an outer periphery;

an annular band affixed to the periphery of said support plate, said band providing a pressure fit with the inner surface of the FNS, and the rear end of each said tongue means being affixed to said annular band; and rearward tension on said ties acting to peel the tongue means from the inside of the FNS and place the anvils in contact with the pressure-drain valves, forcing the valves to open.

26. Apparatus as in claim 25, further comprising:

rear support plate means affixed to the rear surface of said main inflatable bag; and a secondary inflatable bag affixed to and moving with said rear support plate means.

27. Apparatus as in claim 26, wherein:

said secondary inflatable bag is doughnut-shaped and has a front and a rear surface;

said apparatus further including:

rear support plate means affixed to the rear surface of the main inflatable bag, the secondary inflatable bag affixed to and moving with said rear support plate means, a cup-shaped container in which said secondary inflatable bag is carried, said container having a rear cover formed with a central aperture, a piston formed with a front flat portion and a rearwardly extending shaft which is coaxial with said central aperture, said flat front portion bearing against the rear surface of said secondary inflatable bag.

* * * * *